United States Patent [19]
Hale

[11] Patent Number: 5,720,638
[45] Date of Patent: Feb. 24, 1998

[54] ENGINE DRIVE SHAFT COUPLER FOR PERSONAL WATERCRAFT

[75] Inventor: David J. Hale, Pickett, Wis.

[73] Assignee: Brunswick Corp., Lake Forest, Ill.

[21] Appl. No.: 735,325

[22] Filed: Oct. 22, 1996

[51] Int. Cl.$^6$ .................................................. B63H 23/24
[52] U.S. Cl. ........................... 440/83; 440/111; 464/73
[58] Field of Search ........................... 440/83, 52, 38, 440/111; 114/270; 464/73, 87, 89, 149, 150, 157, 180, 182

[56] References Cited

U.S. PATENT DOCUMENTS

| | | | |
|---|---|---|---|
| 3,837,179 | 9/1974 | Barth | 464/182 |
| 4,037,431 | 7/1977 | Sugimoto | 464/73 |
| 4,631,032 | 12/1986 | Nishida | 440/47 |
| 4,689,028 | 8/1987 | Murase | 440/88 |
| 4,722,707 | 2/1988 | Murase | 440/38 |
| 4,743,213 | 5/1988 | Nishida | 440/1 |
| 4,813,898 | 3/1989 | Nakase et al. | 440/111 |
| 4,925,408 | 5/1990 | Webb et al. | 440/38 |
| 4,984,528 | 1/1991 | Kobayashi | 114/270 |
| 5,282,444 | 2/1994 | Ito et al. | 123/192.2 |

FOREIGN PATENT DOCUMENTS

| | | | |
|---|---|---|---|
| 2439558 | 2/1976 | Germany | 464/73 |
| 2609008 | 9/1976 | Germany | 464/73 |

OTHER PUBLICATIONS

Rotex Torsionally flexible shaft couplings, KTR Corporation.

Primary Examiner—Ed L. Swinehart
Attorney, Agent, or Firm—Andrus, Sceales, Starke & Sawall

[57] ABSTRACT

A jet propelled watercraft has a coupling assembly to couple an engine crankshaft to a jet pump impeller shaft. The coupling assembly can accommodate substantial engine crankshaft vibrations, yet effectively isolates the jet pump impeller shaft from transverse movement. The coupling assembly includes an engine crankshaft coupling head, an intermediate coupler, an impeller shaft coupling head, and two elastomeric isolators positioned between each of the coupling heads and the intermediate coupler. The intermediate coupler is supported exclusively by the elastomeric isolators, and is allowed to tilt transverse to the rotational axis of the intermediate coupler to accommodate engine crankshaft displacement. The coupling assembly is practical for personal watercraft because, although elastomeric isolators wear or shred quickly in the presence of transverse misalignment, elastomeric isolators provide significant durability in the presence of a reasonable amount of angular displacement. The coupling assembly allows the engine to be soft mounted to the hull of the watercraft, and therefore significantly reduces engine noises resonating from the watercraft hull.

30 Claims, 3 Drawing Sheets

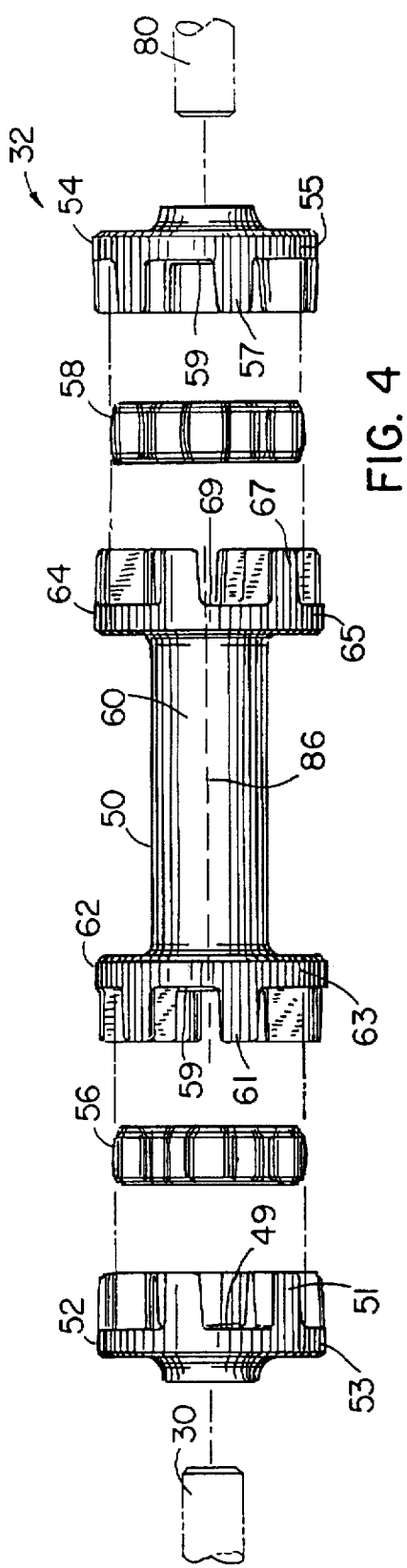
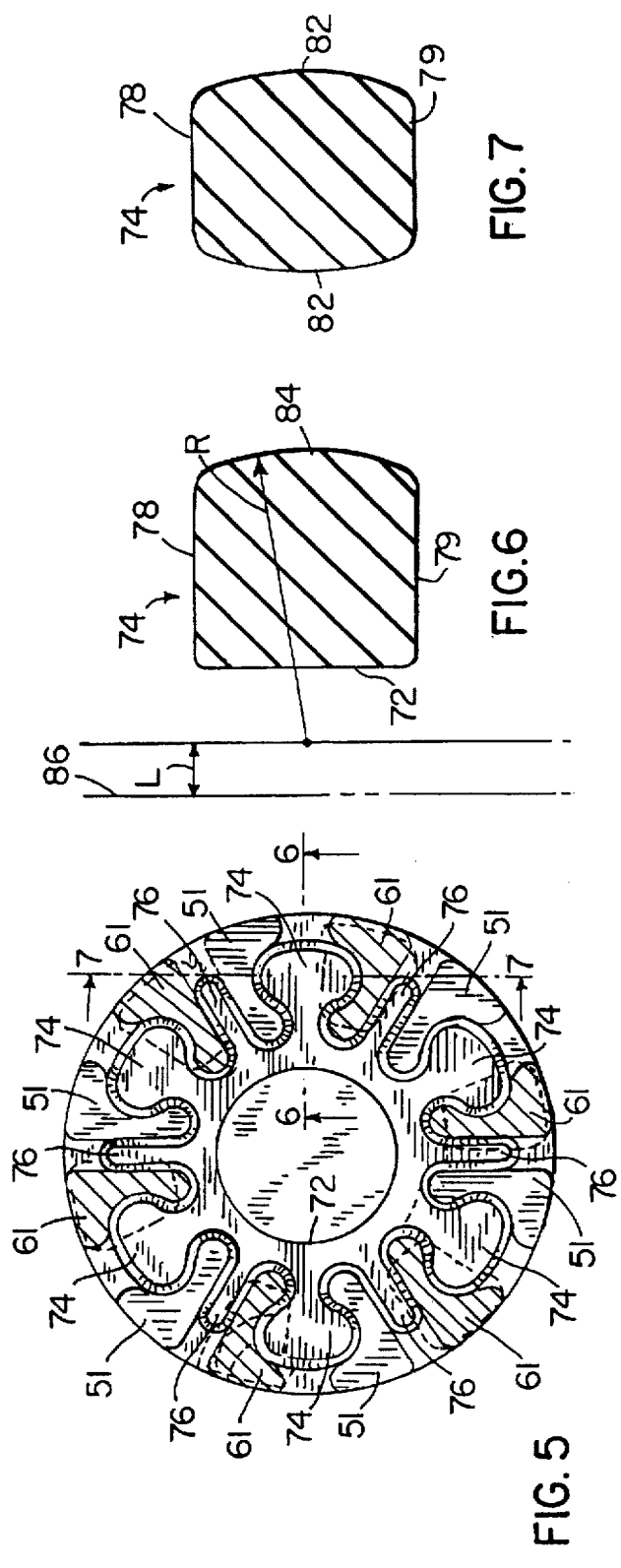

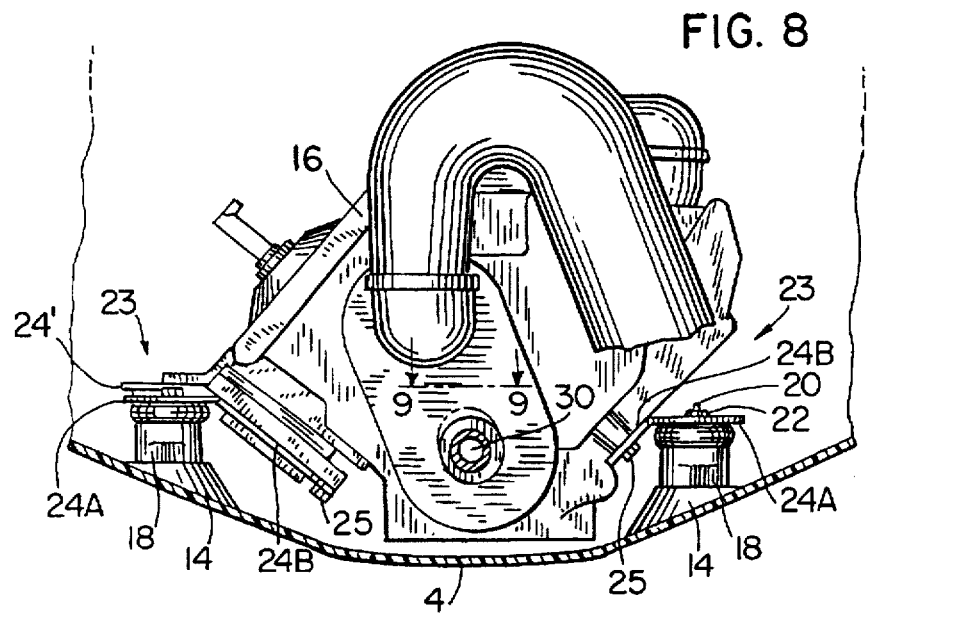
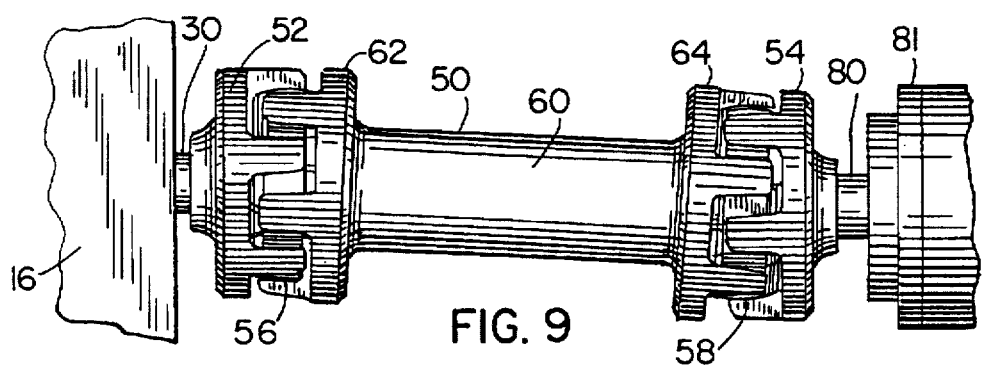
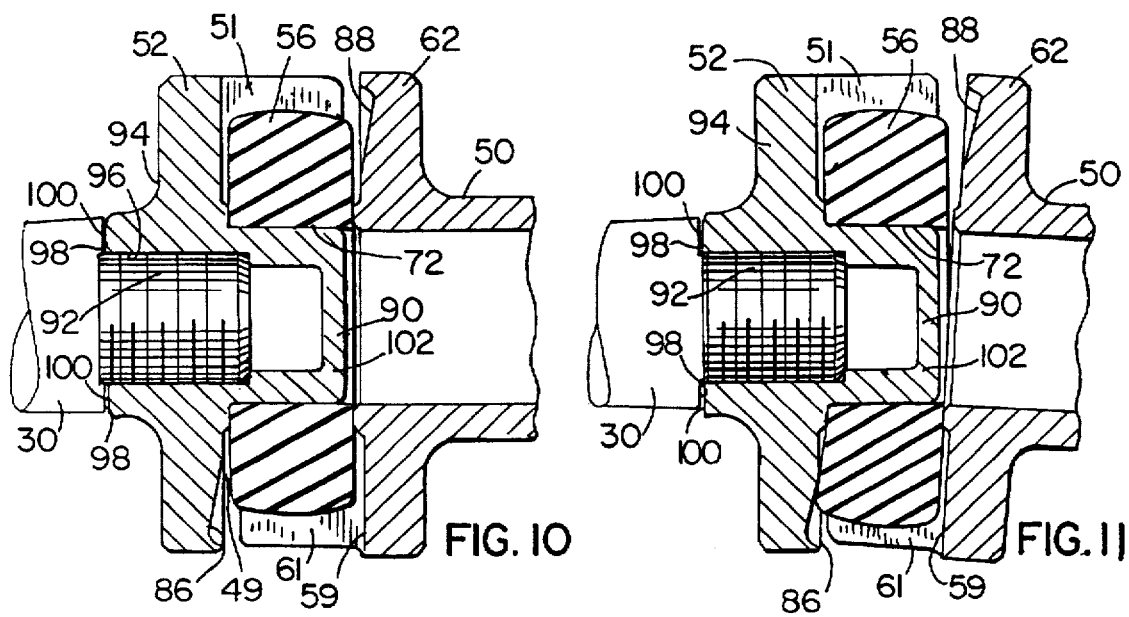

ENGINE DRIVE SHAFT COUPLER FOR PERSONAL WATERCRAFT

FIELD OF THE INVENTION

The invention relates to engine drive systems for jet-propelled watercraft. In particular, the invention relates to a coupling assembly that couples an engine crankshaft to a jet pump impeller shaft. The coupling assembly facilitates the reduction of watercraft noise while maintaining the structural integrity of the jet pump.

BACKGROUND OF THE INVENTION

Personal watercraft jet drives typically have an engine driven jet pump located within a duct in the hull of the watercraft. The jet pump generally consists of an impeller and a stator located within the duct followed by a nozzle. The impeller rotates within a wear ring and is driven by an impeller shaft that is coupled to the engine. The impeller provides energy to the flow of sea water flowing through the pump. From the impeller, the sea water flows through the stator and the nozzle before exiting rearward through a generally tubular rudder that can rotate to steer the watercraft. For jet pump performance and durability, it is important that the impeller shaft remain in a fixed position and that the impeller shaft and the impeller remain properly aligned. It is also important that the impeller, as well as the other components of the jet pump, be substantially isolated from engine vibrations. For these reasons, the impeller shaft is supported in most personal watercraft immediately upstream of the jet pump by a rigid bearing assembly.

Various methods have been used in the past to couple the engine crankshaft to the impeller shaft. The purpose of many of these prior coupling systems is to dampen or isolate engine crankshaft vibrations so that a substantial amount of vibrations do not propagate to the impeller shaft. Such prior coupling systems include barrel splined shaft arrangements having sophisticated seals and bearings that are mounted in rubber housings, etc. These prior systems are relatively expensive, and provide only a small range of freedom for the engine Crankshaft to move relative to the impeller shaft.

Elastomeric vibration isolators are typically used to assist in coupling the engine crankshaft to the impeller shaft. Elastomeric isolators tend to wear quickly when the engine crankshaft is misaligned transversely relative to the impeller shaft even a small amount.

Due to the above and other limitations on prior coupling systems, it is necessary to minimize the vibration of the engine by tightly securing, or stiffly mounting, the engine to the hull of the personal watercraft. As a consequence, the engine vibrations in these personal watercraft propagate to the hull of the watercraft. The hull often resonates or amplifies the vibrations, thereby causing a substantial amount of undesirable noise during the operation of the watercraft.

In addition, most prior coupling systems use a bearing attached to the hull structure to lend further support to the impeller shaft. Even though the bearing may include an elastomeric journal, the additional contact with the hull can create even more undesirable noise by resonating vibrations through the hull.

BRIEF SUMMARY OF THE INVENTION

The invention is a coupling assembly that couples the engine crankshaft to the impeller shaft, and in its preferred embodiment, overcomes many of the above noted problems.

More specifically, a coupling assembly in accordance with the invention has an impeller shaft coupling head, an engine crankshaft coupling head, an intermediate coupler, and two elastomeric isolators positioned between each of the coupling heads and the intermediate coupler. The intermediate coupler is supported exclusively by the elastomeric isolator for the engine crankshaft coupling head, and the elastomeric isolator for the impeller shaft coupling head. The intermediate coupler is thus allowed to tilt transverse to the rotational axis of the intermediate coupler to accommodate engine crankshaft displacement, yet isolates the jet pump impeller shaft from transverse movement of the engine crankshaft.

Although elastomeric isolators wear or shred quickly with transverse misalignment, elastomeric isolators provide significant durability in the presence of a reasonable amount of angular displacement. Therefore, the length of the intermediate coupler should be as long as possible between the engine crankshaft coupling head and the impeller coupling head to maximize the amount of engine crankshaft displacement that can be accommodated without tilting the intermediate coupler excessively. By using an intermediate coupler having substantial length, the engine can be soft mounted to the hull of the personal watercraft, thus permitting the engine to vibrate substantially with respect to the hull and reducing undesirable noise from emanating from the hull.

The preferred intermediate coupler has fingers that interlock with fingers on the coupling heads. Both of the coupling heads, as well as the intermediate coupler coupling head, have depressions between the fingers on the coupling head to provide clearance for the opposed interlocking fingers when the intermediate coupler tilts to accommodate engine crankshaft displacement. The depressions avoid undesirable metal-to-metal contact.

The preferred elastomeric isolator has a generally disk shape with a central portion, a hole through the center of the central portion, and load bearing lobes extending outward from the central portion. The hole through the center allows the elastomeric isolator to receive a boss extending from the respective coupling head, thereby providing additional structural support for the elastomeric isolator.

The load bearing lobes on the preferred elastomeric isolator are barrel shaped and provide a convex driving surface against the fingers on the coupling heads. This configuration not only provides for more uniform load distribution on the fingers when the intermediate coupler tilts to accommodate engine crankshaft displacement, but also reduces friction and the associated heat generated in the elastomeric isolator when the intermediate coupler tilts.

It is also preferred that the elastomeric isolators be pre-compressed when the isolators are positioned between the coupling heads and the intermediate coupler. Pre-compression of elastomeric isolators requires an extremely tight fit between the elastomeric isolator and the coupling heads and prevents the creation of coupler chatter noise between interlocking fingers on respective coupling heads.

The invention thus carries out the following objectives:

A primary object of the present invention is to provide a coupling assembly in accordance with the present invention that allows an engine for the watercraft to be soft mounted to the hull of the personal watercraft jet, yet effectively isolates the jet pump impeller shaft from engine vibrations. With such a coupling assembly, the engine can vibrate without creating substantial undesirable noise resonating through the hull and without compromising the performance and the integrity of the jet pump system.

Another object of the invention is to provide such a coupling system that is durable and relatively inexpensive to manufacture and assemble.

A more specific object of the invention is to provide a coupling assembly that is free-standing between the engine crankshaft and the impeller shaft and does not need to be supported by a bearing assembly in the hull structure. Such a coupling system further reduces vibrations propagating to the hull, and thus further reduces noise emanating from the hull.

A further object of the invention is to provide a geometry for an elastomeric coupling isolator that allows maximum relative movement of the engine crankshaft with respect to the impeller shaft while minimizing friction and heat generation within the elastomeric isolator. Such a geometry extends the useful life of the elastomeric coupling isolator.

Still another object of the invention is to provide a coupling assembly that does not chatter when the watercraft is in operation.

Various other objects, features and advantages of the invention may be apparent from the following drawings and the detailed description thereof.

BRIEF DESCRIPTION OF THE DRAWINGS

FIG. 4 is an exploded view of the coupling assembly in accordance with the invention;

FIG. 5 is a cross-sectional view of the coupling assembly taken along the line 5—5 of FIG. 3;

FIG. 6 is a cross-sectional view of the elastomeric isolator taken along the line 6—6 of FIG. 5;

FIG. 7 is a cross-sectional view of the elastomeric isolator taken along the line 7—7 of FIG. 5;

FIG. 8 is a cross-sectional view of the coupling assembly taken along line 8—8 of FIG. 2;

FIG. 9 is an enlarged side elevational view of the coupling assembly of the invention in operation;

FIG. 10 is a sectional view of a portion of a coupling assembly according to the invention; and FIG. 11 is another sectional view of a portion of a coupling assembly according to the invention.

DETAILED DESCRIPTION OF THE INVENTION

Figure 1:
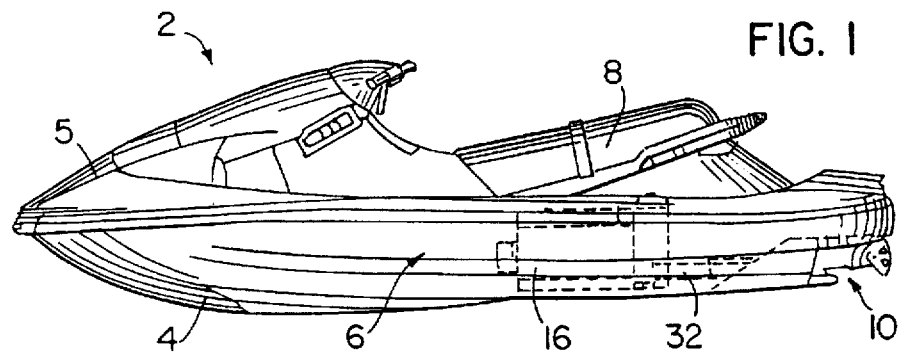
FIG. 1 is a side elevational view of a personal watercraft constructed in accordance with the invention.

FIG. 1 shows a personal watercraft 2. The watercraft 2 has a hull 4, and a deck 5, both preferably made of fiber reinforced plastic. A driver and/or passenger riding on the watercraft 2 straddles a seat 8. The driver steers the watercraft 2 using a steering assembly located forward of the seat 8. An engine compartment 6 is located between the hull 4 and the deck 5. A gasoline fueled internal combustion engine 16 is located within the engine compartment 6 underneath the seat 8. A fuel tank (not shown) is located forward of the engine 16. The engine 16 has a crankshaft 30 that is coupled via a coupling assembly 32 to a jet pump 10 located rearward of the engine 16 generally in the vicinity shown by arrow 10. The jet pump 10 propels the watercraft 2.

Figure 2:
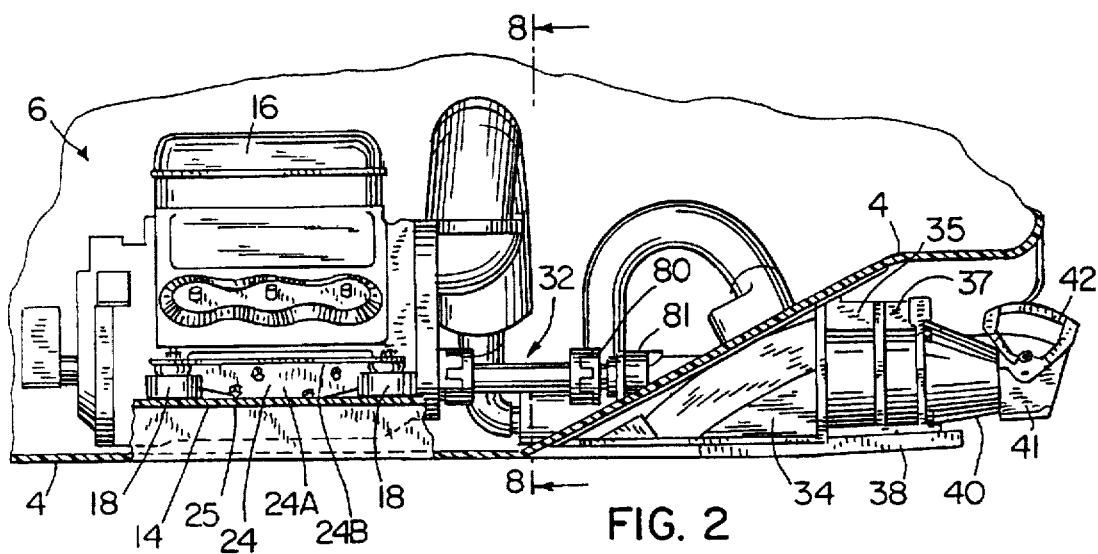
FIG. 2 is an enlarged side elevational view showing an engine, a jet propulsion system, and a coupling assembly in accordance with the invention.

Referring now in particular to FIG. 2, the jet pump 10 includes an intake housing 34 that is attached to the hull 4, an impeller that rotates within a wear ring 35, a stator 37, and a nozzle 40 all attached to the intake housing 34. The preferred intake housing 34 is described in detail in copending patent application Ser. No. 08-710,868, entitled "Intake Housing for Personal Watercraft", by James R. Jones, and assigned to the assignee of the present application, which is herein incorporated by reference. The intake housing 34 has an inlet opening (not shown) that provides a path for sea water to flow into an intake duct located within the intake housing 34. Sea water flows upward and rearward through the intake duct to the impeller rotating within the wear ring 35. The wear ring 35 is attached to the intake housing 34 rearward of the intake duct. The impeller is rotatably driven by an impeller drive shaft 80 which is coupled to the engine crankshaft 30, FIG. 3, via coupling assembly 32. As the impeller rotates within the wear ring 35, the impeller accelerates sea water flowing through the intake housing 34. The stator 37 is located downstream of the impeller, and includes several stationary vanes to remove swirl from the accelerated sea water. When the sea water exits the stator 37, it flows through a nozzle 40. A tubular rudder 41 is rotatably mounted to the nozzle 40 about a vertical axis to direct the jet of water from the nozzle 40 and steer the watercraft 2. A reverse gate 42 is rotatably mounted about a horizontal pivot axis. The reverse gate 42 can be lowered into a reverse position, FIG. 1, to redirect the jet of water from the rudder 41 and provide reverse thrust. Alternatively, the reverse gate 42 can be lowered to a neutral position when neither forward nor reverse thrust is desired. Such a neutral position can be advantageous when steering in delicate docking situations. In any event, it is important to note that the drive is a unidirectional drive, and reverse and neutral are provided by properly positioning reverse gate 42.

Although it is not shown in the drawings, the aft end of the impeller drive shaft is rigidly mounted in a bearing assembly preferably in the stator 37 so that the impeller is precisely located within the wear ring 35. Likewise, the fore end of the impeller drive shaft 80 is rigidly supported in a sealed roller bearing assembly 81 that maintains the impeller drive shaft 80 in a fixed location relative to the intake housing 34. To optimize the performance and durability of the pump 10, it is desirable that the impeller and the impeller drive shaft 80 be rigidly mounted in proper alignment with respect to the intake housing 34 and the wear ring 35. The preferred impeller shaft mounting system is disclosed in detail in copending patent application Ser. No. 08-719,621, entitled "Impeller Mounting For Personal Watercraft", by James R. Jones, and assigned to the assignee of the present application, which is herein incorporated by reference.

In accordance with the invention, the coupling assembly 32 allows the engine 16 to vibrate or otherwise move with respect to the impeller drive shaft 80 without affecting the precise alignment of the impeller shaft 80 and/or the impeller within the wear ring 35.

Referring now to FIGS. 2 and 8, the inside surface of the hull 4 contains a plurality of integral engine mounting platforms 14 upon which the engine 16 is mounted. Mounting studs 20 are molded into the platforms 14 and extend upward therefrom. Soft engine mounts 23 are used to mount the engine 16 to the engine mounting platforms 14 on the hull 4. The soft engine mounts 23 each include a generally cylindrical elastomeric damping element 18 having a coaxial opening through which the mounting studs 20 axially extend. There are two engine mounting brackets 24 that are used to mount the engine 16 on the soft engine mounts 23. The engine 16 is mounted so that the engine crankshaft is generally horizontal, and the axis of the engine cylinders is preferably tilted approximately 50° with respect to a vertical plane. The engine mounting brackets 24 each have a portion 24B that is secured to the engine block of the engine 16 using fasteners, preferably bolts 25B. Another portion 24A of the engine mounting brackets 24 extends horizontally, and is used to support the engine 16 on the soft engine mounts 23. Nuts 22 secure the horizontal portion 24A of the engine mounting brackets 24 to the engine mounting studs 20 with the cylindrical elastomeric damping element 18 being disposed between the horizontal portion 24A of the mounting bracket 24 and the engine mounting platforms 14 molded into the hull 4. Because of this type of soft mounting, the engine 16 is permitted to vibrate relative to the hull 4, as illustrated by vibrating mounting bracket 24' shown in phantom. The amount of noise able to resonate from the personal watercraft 2 due to engine vibrations is therefore substantially reduced.

Figure 3:
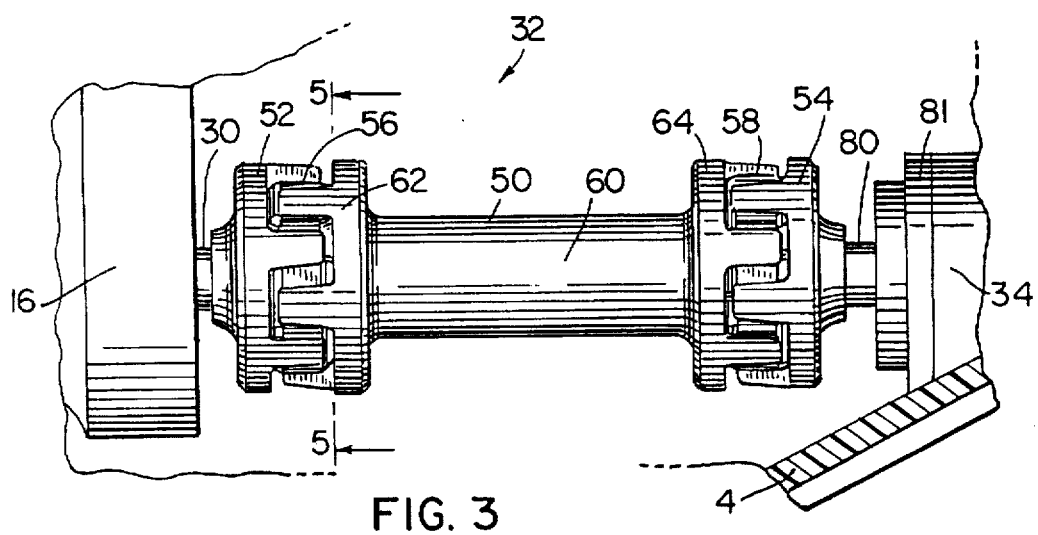
FIG. 3 is an enlarged side elevational view of the coupling assembly in accordance with invention.

Referring to FIG. 3, the coupler assembly 32 accommodates a substantial amount of engine 16 displacement, while isolating the jet pump 10 and in particular the jet pump impeller shaft 80 from engine crankshaft vibrations. The coupling assembly 32 includes an intermediate coupler 50, a crankshaft coupling head 52 secured to the engine crankshaft 30, an impeller shaft coupling head 54 secured to the impeller shaft 80 and first and second elastomeric isolators 56, 58. The intermediate coupler 50 has a longitudinal shaft 60 and a first intermediate coupling head 62 at the end of the longitudinal shaft 60 towards the engine crankshaft 30, and a second intermediate coupling head 64 at the end of the longitudinal shaft 60 towards the impeller shaft 80. The first elastomeric isolator 56 is positioned between the crankshaft coupling head 52 and the first intermediate coupling head 62 on intermediate coupler 50. The second elastomeric isolator 58 is positioned between the impeller shaft coupling head 54 and the second intermediate coupling head 64 on the intermediate coupler 50. It is preferred that the intermediate coupler 50 be supported exclusively by the first elastomeric isolator 56 and the second elastomeric isolator 58. That is, in the preferred embodiment of the coupling assembly 32 as shown in the drawings, it should not be necessary to support the intermediate coupler 50 along the longitudinal shaft 60 of the intermediate coupler 50.

FIG. 4 shows the coupling assembly 32 disassembled. The coupling heads 52, 62 and 54, 64 consist of a generally circular disk 53, 63 and 55, 65, respectively, with a plurality of equally spaced fingers projecting perpendicularly from the circular disk towards the location where the elastomeric isolator 56, 58 is positioned. More specifically, fingers 51 on the crankshaft coupling head 52 extend perpendicularly from an inner face 49 on the circular disk 53 of the crankshaft coupling head 52. Fingers 61 extend perpendicularly from an inner face 59 on the circular disk 63 of the intermediate coupler coupling head 62. Likewise, fingers 57 extend perpendicularly from the inner surface 59 on the circular disk 55 for the impeller shaft coupling head 54. And, fingers 67 extend perpendicular from inner face 69 on the circular disk 65 for coupling head 64 on the intermediate coupler 50. The fingers 51 on the crankshaft coupling head 52 interlock with the first elastomeric isolator 56 as do the fingers 61 on coupling head 62 for the intermediate coupler 60. Likewise, fingers 67 on the coupling head 64 for the intermediate coupler 60 interlock with the second elastomeric isolator 58 as do the fingers 57 on the impeller shaft coupling head 54. In general, the engine 16 rotates the crankshaft 30 and the crankshaft coupling head 52, which in turn applies a rotational load on the first elastomeric isolator 56 which in turn applies a rotational load on the intermediate coupler 50. The intermediate coupler 50 rotates and applies a rotational load to the second elastomeric isolator 58, which in turn applies a rotational load to the impeller shaft coupling head 54 and the impeller shaft 80 to drive the jet pump 10.

Referring now to FIG. 5, the elastomeric isolators 56, 58 are generally in the form of a wholly integral circular disk having a central portion 70 with a central opening therethrough 72, and a plurality of equally spaced load blaring lobes 74 extending radially from the central portion 70. The elastomeric isolators also have a plurality of non-load bearing lobes 76 extending radially from the central portion 70 which are located between adjacent load bearing lobes 74. As described above, the personal watercraft 2 has a unidirectional drive (i.e. neutral and reverse thrust are created using a reverse gate). Therefore, the crankshaft 30 always rotates in the same direction which in FIG. 5 is in the clockwise direction. The view in FIG. 5 is taken along line 5—5 in FIG. 3 which is looking forward from the jet pump 10 to the engine 16. The entire driving force for the watercraft 2 is transferred through the load bearing lobes 74 in the elastomeric isolators 56, 58. In particular, the fingers 51 on the crankshaft coupling head 52 push against the load bearing lobes 74 which in turn push against the fingers 61 on the coupling head 62 for the intermediate coupler 60 to rotate the coupler. The non-load bearing lobes 76 provide a cushion between the fingers 51 and 60 when the engine crankshaft 30 decelerates.

The elastomeric isolators 56, 58 are preferably made of a neoprene material, and a suitable elastomeric isolator 56, 58 can be obtained from the Lord Corporation, Mechanical Products Division, Erie. Pa., neoprene per ASTM D2000; M3BC717C1ZEO14EO34 F17G21K11Z, Z=C12 method B per C32.

Referring now to FIGS. 6 and 7, the load bearing lobes 74 extend across the entire elastomeric isolator disc between a first plane 78 and a second parallel plane 79. Both planes 78 and 79 are generally perpendicular to the opening 72 in the central portion 70 of the elastomeric isolator 56, 58 and are also generally perpendicular to the respective crankshaft 30 or impeller shaft 80 when the elastomeric isolator 56, 58 is positioned within the coupling assembly 32. The load bearing lobes 74 have a convex driving surface 82 that extends between the first plane 78 and the second plane 79. The outer portion of the load bearing lobe 84, is also convex. The purpose of the convex driving surfaces 82 and the convex outer surface 84 on the load bearing lobe 74 is to facilitate uniform loads over the load bearing lobes 74 even when the intermediate coupler 50 tilts to accommodate engine crankshaft displacement. The convex surfaces 82, 84 on the load bearing lobes 74 of the elastomeric isolators 56, 58 also reduce the amount of friction between the fingers 51, 61 and isolator 56, or respectively, fingers 67, 57 and isolator 58, and therefore reduce the amount of heat generated at that interface. The reduction in friction, and the reduction in heat generation increase the useful life of the elastomeric isolators 56, 58. In addition, it is desirable to manufacture the elastomeric isolators 56, 58 so that the load bearing lobes 74 are slightly oversized such that it is necessary to pre-compress the lobes 74 when installing the isolators 56, 58. Pre-compressing the elastomeric isolators 56, 58 in this manner helps to prevent coupler chatter noise during watercraft operation. The convex surfaces 82, 84 on the load bearing lobes 74 make it substantially more convenient to install and interlock the elastomeric isolators 56, 58 with the oversized load bearing lobes 74 between the fingers 51, 61, 67, 57, of the coupling heads 52, 62, 64, 54.

Note that the convex surfaces 82, 84 can accommodate tilt of the intermediate coupler 50 in the horizontal direction as well as in the vertical direction. To enhance performance of the convex surfaces 82, 84, it is preferred that the radius of curvature R of the convex surfaces 82, 84 be less than the distance (R+L) of the load beating lobes 56, 58 to the central pivot axis 86, FIG. 4, of the longitudinal shaft 60 of the intermediate coupler 50.

FIG. 9 shows the intermediate coupler 50 tilting with respect to the impeller shaft 80. FIGS. 10 and 11 illustrate in detail the interaction between the coupling heads 52, 56 and the elastomeric isolator 56 when the intermediate coupler 50 is not tilting, FIG. 10, and when the intermediate coupler 50 is tilting, FIG. 11. The interaction between coupling heads 64, 54 and elastomeric isolator 58, although not specifically shown, should be similar.

The inner face 49 of the crankshaft coupling head 52 has a plurality of depressions 86 located between adjacent fingers 51 projecting from the inner face 49. The depressions 86 on the inner face 49 of the crankshaft coupling head 52 provide clearance for the fingers 61 projecting from the inner face 59 of coupling head 62 on the intermediate coupler 50. The clearance provided by the depressions 86 is important so that there is not metal-to-metal contact between the fingers 61 on the intermediate coupler 50 and the inner face 49 of the crankshaft coupling head 52 when the coupler tilts. In addition, the inner face 59 of the coupling head 62 for the intermediate coupler 50 includes a plurality of depressions 88 located between adjacent fingers 61 on the inner face 59 of the coupling head 62 for the intermediate coupler 50. The depressions 88 on the inner face 59 of the intermediate coupler coupling head 62 provide clearance for fingers 51 on the crankshaft coupling head 52 when the intermediate coupler 50 tilts with respect to the crankshaft 30. Likewise, the purpose of the depressions 88 on the intermediate coupler coupling head 62 is to prevent metal-to-metal contact between the inner face 59 of the coupling head 62 and the fingers 51 on the crankshaft coupling head 52 when the coupler tilts.

FIGS. 10 and 11 also show a cylindrical boss 90 projecting from the inner face 49 of the crankshaft coupling head 52. The cylindrical boss 90 is coaxial with the crankshaft 30, and is inserted into the central opening 72 through the elastomeric isolator 56. Providing the boss 90 in the central opening 72 of the elastomeric isolator 56 adds significantly to the structural integrity of the elastomeric isolator 56, and greatly improves its useful life. Likewise, it is preferred that the coupling head 54 for the impeller shaft 80 would include a boss 90 that would be received in central opening 72 in elastomeric isolator 58.

FIGS. 10 and 11 show the crankshaft coupling head 52 being secured to a threaded portion 92 at the aft end of the crankshaft 30. It is desirable to prevent galvanic corrosion between the threaded portion 92 of the crankshaft 30 and the coupling head 52. The specific structure shown in FIGS. 10 and 11 provides significant sealing characteristics to prevent galvanic corrosion. In particular, an outer face 94 of the crankshaft coupling head 52 has a crankshaft opening 96 into which the threaded portion 92 of the crankshaft 30 is screwed. The crankshaft 30 has flat shoulders 98 perpendicular and adjacent to the threaded portion 92 of the crankshaft. The crankshaft coupling head 52 has a corresponding flat sealing surface 100 surrounding the crankshaft opening 96. The crankshaft coupling head 52 is tightened to the crankshaft 30 to seal the flat shoulder 98 on the crankshaft 30 against the flat sealing surface 100 surrounding the crankshaft opening 96 in the crankshaft coupling head 52. It may be desirable to use a sealant to further seal the interface between the crankshaft opening 96 in the crankshaft coupling head 52 and the crankshaft 30. The threaded portion 92 of the crankshaft 30 preferably extends at least partially into the boss 90. The boss 90 should include an inner end wall 102 to further seal the interface between the crankshaft 30 and the opening 96 in the crankshaft coupling head 52.

Although it is not specifically shown in the drawings, the structure for the impeller shaft 80, the impeller shaft coupling head 54, and the coupling head 64 on the intermediate coupler 50 are preferably identical to the corresponding parts in FIGS. 10 and 11 (i.e. impeller shaft 80 corresponds to crankshaft 30, impeller shaft coupling head 54 corresponds to crankshaft coupling head 52, and coupling head 64 on intermediate coupler 50 corresponds to coupling head 62 on intermediate coupler 50).

As should be apparent to those skilled in the art upon studying this disclosure, the maximum allowable amount of engine displacement can be optimized by lengthening the length of the intermediate coupler 50 so the elastomeric isolators 56, 58 will see only a reasonable amount of angular displacement, even in the presence of substantial engine crankshaft vibrations.

It is recognized that other equivalents, alternatives, and modifications aside from those expressly stated, are possible and within the scope of the appended claims.

I claim:

1. In a jet-propelled watercraft including an engine having a crankshaft, an impeller shaft driving a jet pump, and a coupling assembly that couples the engine crankshaft to the impeller shaft, the coupling assembly comprising:

an impeller shaft coupling head secured to the impeller shaft;

a crankshaft coupling head secured to the engine crankshaft;

an intermediate coupler having a longitudinal shaft and a first intermediate coupling head at one end of the longitudinal shaft and a second intermediate coupling head at another end of the longitudinal shaft;

a first elastomeric isolator positioned between the crankshaft coupling head and the first intermediate coupling head on the intermediate coupler; and a second elastomeric isolator positioned between the impeller shaft coupling head and the second intermediate coupling head on the intermediate coupler;

wherein the intermediate coupler is supported exclusively by the first elastomeric isolator which is positioned between the crankshaft coupling head and the first intermediate coupling head on the intermediate coupler, and the second elastomeric isolator which is positioned between the impeller shaft coupling head and the second intermediate coupling head on the intermediate coupler.

2. The coupling assembly according to claim 1 wherein the engine is soft mounted to a hull of the personal watercraft to permit the engine to vibrate with respect to the hull.

3. The coupling assembly according to claim 1 wherein:

the crankshaft coupling head has an inner face that is perpendicular to the crankshaft, a plurality of equally spaced fingers projecting from the inner face, and a depression located between adjacent fingers on the inner face;

the first intermediate coupling head has an inner face that is perpendicular to the longitudinal shaft, a plurality of equally spaced fingers projecting from the inner face, and a depression located between adjacent fingers on the inner face; and the depressions of the inner face of the crankshaft coupling head provide clearance for the fingers projecting from the inner face of the first intermediate coupling head, and the depressions of the inner face of the first intermediate coupling head provides clearance for the fingers projecting from the inner face of the crankshaft coupling head.

4. The coupling assembly according to claim 1 wherein:

the impeller shaft coupling head has an inner face that is perpendicular to the impeller shaft, a plurality of equally spaced fingers projecting from the inner face, and a depression located between adjacent fingers on the inner face;

the second intermediate coupling head has an inner face that is perpendicular to the longitudinal shaft, a plurality of equally spaced fingers projecting from the inner face, and a depression located between adjacent fingers on the inner face; and the depressions on the inner face of the impeller shaft coupling head provide clearance for the fingers projecting from the inner face of the second intermediate coupling head, and the depressions of the inner face of the second intermediate coupling head provide clearance for the fingers projecting from the inner face of the impeller shaft coupling head.

5. The coupling assembly according to claim 3 wherein:

the impeller shaft coupling head has an inner face that is perpendicular tothe impeller shaft, a plurality of equally spaced fingers projecting from the inner face, and a depression located between adjacent fingers on the inner face;

the second intermediate coupling head has an inner face that is perpendicular to the longitudinal shaft, a plurality of equally spaced fingers projecting from the inner face, and a depression located between adjacent fingers on the inner face; and the depressions on the inner face of the impeller shaft coupling head provide clearance for the fingers projecting from the inner face of the second intermediate coupling head, and the depressions of the inner face of the second intermediate coupling head provide clearance for the fingers projecting from the inner face of the impeller shaft coupling head.

6. In a jet-propelled watercraft including an engine having a crankshaft, an impeller shaft driving a jet pump, and a coupling assembly that couples the engine crankshaft to the impeller shaft, the coupling assembly comprising:

an impeller shaft coupling head secured to the impeller shaft;

a crankshaft coupling head secured to the engine crankshaft;

an intermediate coupler having a longitudinal shaft and a first intermediate coupling head at one end of the longitudinal shaft and a second intermediate coupling head at another end of the longitudinal shaft;

a first elastomeric isolator positioned between the crankshaft coupling head and the first intermediate coupling head on the intermediate coupler; and a second elastomeric isolator positioned between the impeller shaft coupling head and the second intermediate coupling head on the intermediate coupler;

wherein the crankshaft coupling head has an inner face that is perpendicular to the crankshaft, a boss projecting from the inner face coaxially with the crankshaft, a plurality of equally spaced fingers projecting from the inner face that are concentric with the boss; and the first elastomeric isolator has a central opening that receives the boss on the crankshaft coupling head so that the central opening of the first elastomeric isolator is mounted directly on the crankshaft coupling head boss.

7. The coupling assembly according to claim 6 wherein the boss is cylindrical.

8. The coupling assembly according to claim 6 wherein the engine crankshaft extends through the crankshaft coupling head so that an end of the crankshaft is located within the boss.

9. The coupling assembly according to claim 8 wherein the boss receiving the end of the crankshaft includes an inner end wall, and the crankshaft coupling head has an outer face having a crankshaft opening that extends into the boss to the inner end wall of the boss, the crankshaft opening receiving the end of the crankshaft.

10. The coupling assembly according to claim 9 wherein the crankshaft has flat shoulders perpendicular and adjacent to the end of the crankshaft located in the crankshaft coupling head, the crankshaft coupling head has a flat sealing surface surrounding the crankshaft opening, and the crankshaft coupling head is tightly mounted to the crankshaft to seal the flat shoulders on the crankshaft against the flat sealing surface surrounding the crankshaft opening in the crankshaft coupling head.

11. The coupling assembly according to claim 10 wherein a sealant is used to seal the crankshaft opening in the crankshaft coupling head.

12. In a jet-propelled watercraft including an engine having a crankshaft, an impeller shaft driving a jet pump, and a coupling assembly that couples the engine crankshaft to the impeller shaft, the coupling assembly comprising:

an impeller shaft coupling head secured to the impeller shaft;

a crankshaft coupling head secured to the engine crankshaft;

an intermediate coupler having a longitudinal shaft and a first intermediate coupling head at one end of the longitudinal shaft and a second intermediate coupling head at another end of the longitudinal shaft;

a first elastomeric isolator positioned between the crankshaft coupling head and the first intermediate coupling head on the intermediate coupler; and a second elastomeric isolator positioned between the impeller shaft coupling head and the second intermediate coupling head on the intermediate coupler;

wherein the impeller shaft coupling head has an inner face that is perpendicular to the impeller shaft, a boss projecting from the inner face coaxially with the impeller shaft, a plurality of equally spaced fingers projecting from the inner face that are concentric with the boss; and, the second elastomeric isolator has a central opening that receives the boss of the impeller shaft coupling head so that the central opening of the first elastomeric isolator is mounted directly on the impeller shaft coupling head boss.

13. The coupling assembly according to claim 12 wherein the boss is cylindrical.

14. The coupling assembly according to claim 12 wherein the impeller shaft extends through the impeller shaft coupling head so that an end of the impeller shaft is located within the boss.

15. The coupling assembly according to claim 14 wherein the boss receiving the end of the impeller shaft includes an inner end wall, and the impeller shaft coupling head has an outer face having an impeller shaft opening that extends into the inner end wall of the boss, the impeller shaft opening receiving the end of the impeller shaft.

16. The coupling assembly according to claim 15 wherein the impeller shaft has flat shoulders perpendicular and adjacent to the end of the impeller shaft located in the impeller shaft coupling head, the impeller shaft coupling head has a flat sealing surface surrounding the impeller shaft opening, and the impeller shaft coupling head is tightly mounted to the impeller shaft to seal the flat shoulders on the impeller shaft against the flat sealing surface surrounding the impeller shaft opening in the impeller shaft coupling head.

17. The coupling assembly according to claim 16 wherein a sealant is used to seal the impeller shaft opening in the impeller shaft coupling head.

18. The coupling assembly according to claim 6 wherein the first elastomeric isolator comprises:
 a disk having a central portion with a central opening therethrough; and
 a plurality of equally spaced load bearing lobes extending radially from the central portion;
 wherein the load bearing lobes extend between a first plane and a second parallel plane, both planes being generally perpendicular to the engine crankshaft when the first elastomeric isolator is positioned between the crankshaft coupling head and the respective intermediate coupler coupling head, and wherein the load bearing lobes have a convex driving surface that extends between the first and second plane so that the load on the load bearing lobes remains substantially uniform even when the intermediate coupler tilts with respect to the crankshaft, the convex driving surface having a radius of curvature that is less than the distance of the load bearing lobe to a pivot axis of the longitudinal shaft of the intermediate coupler.

19. The coupling assembly according to claim 6 wherein the first elastomeric isolator comprises:
 a disk having a central portion with a central opening therethrough; and
 a plurality of equally spaced load bearing lobes extending radially from the central portion;
 wherein the load bearing lobes extend between a first plane and a second parallel plane, both planes being generally perpendicular to the engine crankshaft when the first elastomeric isolator is positioned between the crankshaft coupling head and the respective intermediate coupler coupling head, and wherein the load bearing loads have a convex driving surface that extends between the first and second planes so that the load on the load bearing lobes remains substantially uniform even when the intermediate coupler tilts with respect to the engine crankshaft.

20. The coupling assembly according to claim 12 wherein the second elastomeric isolator comprises:
 a disk having a central portion with a central opening therethrough; and
 a plurality of equally spaced load bearing lobes extending radially from the central portion;
 wherein the load bearing lobes extend between a first plane and a second parallel plane, both planes being generally perpendicular to the impeller shaft when the second elastomeric isolator is positioned between the crankshaft coupling head and the respective intermediate coupler coupling head, and wherein the load bearing lobes have a convex driving surface that extends between the first and second plane so that the load on the load bearing lobes remains substantially uniform even when the intermediate coupler tilts with respect to the impeller shaft, the convex driving surface having a radius of curvature that is less than the distance of the load beating lobe to a pivot axis of the longitudinal shaft of the intermediate coupler.

21. The coupling assembly according to claim 12 wherein the second elastomeric isolator comprises:
 a disk having a central portion with a central opening therethrough; and
 a plurality of equally spaced load bearing lobes extending radially from the central portion;
 wherein the load bearing lobes extend between a first plane and a second parallel plane, both planes being generally perpendicular to the impeller shaft when the second elastomeric isolator is positioned between the crankshaft coupling head and the respective intermediate coupler coupling head, and wherein the load bearing lobes have a convex driving surface that extends between the first and second plane so that the load on the load bearing lobes remains substantially uniform even when the intermediate coupler tilts with respect to the impeller shaft.

22. An improved coupling head for a shaft comprising:
 means for securing the coupling head to a shaft;
 an inner face that is perpendicular to the shaft when the coupling head is secured to the shaft;
 a cylindrical boss projecting from a central portion of the inner face;
 a plurality of equally spaced fingers projecting concentrically from the inner face around the central boss; and
 a depression on the inner face between adjacent fingers projecting from the inner face;
 wherein the shaft extends through the coupling head so that an end of the shaft is located within the boss and the boss receiving the end of the shaft includes an inner end wall, and further wherein the coupling head has an outer face having a shaft opening that extends into the boss to the inner end wall of the boss and the shaft extends in the shaft opening into the boss on the coupling head.

23. The coupling head according to claim 22 wherein the coupling head is secured to an engine crankshaft.

24. The coupling head according to claim 22 wherein the coupling head is secured to an impeller shaft.

25. In a personal watercraft having a coupling assembly that couples an engine crankshaft to an impeller shaft, the coupling assembly including:
 a first coupling head having an inner face and a plurality of equally spaced fingers projecting from the inner face;
 a second coupling head having an inner face and a plurality of equally spaced fingers projecting from the inner face; and
 an elastomeric isolator positioned between the inner surface of the first coupling head and the inner surface of the second coupling head, the elastomeric isolator comprising:
  a disk having a central portion with a central opening therethrough;
  a plurality of equally spaced load beating lobes extending radially from the central portion; and
  a plurality of non-load bearing lobes extending radially from the central portion and located between adjacent load bearing lobes;

wherein a central rotation axis passes through the central opening of the disk, the load bearing lobes extend between a first plane and a second parallel plane which are both perpendicular to the central rotation axis passing through the central opening of the disk, and the load bearing lobes have a three-dimensionally convex surface that extends between the first and second planes in which a middle portion of the convex surface is located between a first side portion of the convex surface near the first plane and a second side portion of the convex surface near the second plane and the middle portion lies outward from the first and second portions.

26. The coupling assembly according to claim 25 wherein the first coupling head is secured to the engine crankshaft.

27. The coupling assembly according to claim 25 wherein the second coupling had is secured to the impeller shaft.

28. A method of assembling a personal watercraft comprising the steps of:

(a) mounting an engine to a hull of the watercraft;

(b) securing a crankshaft coupling head to the engine crankshaft;

(c) securing an impeller shaft coupling head to the impeller shaft;

(d) disposing an intermediate coupler between the crankshaft coupling head and the impeller shaft coupling head;

(e) interposing a first elastomeric isolator between the intermediate coupler and the crankshaft coupling head;

(f) interposing a second elastomeric isolator between the intermediate coupler and the impeller shaft coupling head; and (g) supporting the intermediate coupler exclusively by the first and second elastomeric isolators.

29. The method of claim 28 wherein the engine is soft mounted to the hull to permit the engine to vibrate with respect to the hull.

30. The method of claim 28 wherein the first and second elastomeric isolators are compressed when the isolators are interposed between the intermediate coupler and each coupling head even when the crankshaft is not rotating.

* * * * *

UNITED STATES PATENT AND TRADEMARK OFFICE
CERTIFICATE OF CORRECTION

PATENT NO. : 5,720,638
DATED : February 24, 1998
INVENTOR(S) : DAVID J. HALE

It is certified that error appears in the above-indentified patent and that said Letters Patent is hereby corrected as shown below:

In The Claims

Claim 5, Col. 9, Line 28, delete "tothe" and substitute therefor ---to the---; Claim 20, Col. 12, Line 6, delete "beating" and substitute therefor ---bearing---; Claim 20, Col. 12, Line 63, delete "beating" substitute therefor ---bearing---; Claim 27, Col. 13, Line 17, delete "had" and substitute therefor ---head---.

Signed and Sealed this

Fifth Day of May, 1998

Attest:

BRUCE LEHMAN

Attesting Officer    Commissioner of Patents and Trademarks